United States Patent
Su et al.

(10) Patent No.: US 10,575,361 B2
(45) Date of Patent: Feb. 25, 2020

(54) FAST SWITCHING BETWEEN CONTROL CHANNELS DURING RADIO RESOURCE CONTROL CONNECTION

(71) Applicant: Apple Inc., Cupertino, CA (US)

(72) Inventors: Li Su, San Jose, CA (US); Sami M. Almalfouh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/883,228

(22) Filed: Jan. 30, 2018

(65) Prior Publication Data

US 2018/0220485 A1 Aug. 2, 2018

Related U.S. Application Data

(60) Provisional application No. 62/452,531, filed on Jan. 31, 2017.

(51) Int. Cl.

| | |
|---|---|
| *H04W 72/12* | (2009.01) |
| *H04W 76/27* | (2018.01) |
| *H04W 72/04* | (2009.01) |
| *H04W 68/00* | (2009.01) |
| *H04W 4/70* | (2018.01) |
| *H04W 28/02* | (2009.01) |
| *H04W 40/22* | (2009.01) |

(52) U.S. Cl.
CPC ............ *H04W 76/27* (2018.02); *H04W 4/70* (2018.02); *H04W 68/00* (2013.01); *H04W 72/042* (2013.01); *H04W 72/1294* (2013.01); *H04W 28/0215* (2013.01); *H04W 40/22* (2013.01)

(58) Field of Classification Search
CPC ............................. H04W 76/27; H04W 4/70
See application file for complete search history.

(56) References Cited

U.S. PATENT DOCUMENTS

| | | |
|---|---|---|
| 8,761,109 B2 | 6/2014 | Nory et al. |
| 8,774,120 B2 | 7/2014 | Chen et al. |

(Continued)

FOREIGN PATENT DOCUMENTS

| | | |
|---|---|---|
| WO | WO2015/199422 | 12/2015 |
| WO | WO2016/114639 | 7/2016 |
| WO | WO2016/184401 | 11/2016 |

OTHER PUBLICATIONS

International Search Report and Written Opinion, Application No. PCT/US2018/016290, dated Mar. 29, 2018, 11 pages.

*Primary Examiner* — Chi H Pham
*Assistant Examiner* — Fahmida S Chowdhury
(74) *Attorney, Agent, or Firm* — Kowert Hood Munyon Rankin and Goetzel PC; Jeffrey C. Hood; Joel L. Stevens

(57) ABSTRACT

This disclosure relates to techniques for fast switching between control channels during a radio resource control connection in a wireless communication system. A cellular base station and a wireless device may establish a radio resource control connection. The base station may provide a physical layer indication to the wireless device of a control channel to monitor for scheduling information. The base station may provide scheduling information to the wireless device on the indicated control channel. The wireless device may monitor the indicated control channel for scheduling information based at least in part on the physical layer indication and may receive the scheduling information provided by the base station on the indicated control channel.

20 Claims, 6 Drawing Sheets

(56) References Cited

U.S. PATENT DOCUMENTS

| | | |
|---|---|---|
| 8,804,586 B2 | 8/2014 | Fong et al. |
| 9,237,570 B2 | 1/2016 | Dinan |
| 9,277,566 B2 | 3/2016 | Wei et al. |
| 9,648,596 B2 | 5/2017 | Palanki et al. |
| 2012/0263047 A1* | 10/2012 | Love ................ H04W 72/00 370/252 |
| 2014/0050191 A1* | 2/2014 | Kim .................. H04L 5/001 370/329 |
| 2015/0146629 A1 | 5/2015 | Ranta-Aho et al. |
| 2016/0112997 A1 | 4/2016 | Chen et al. |
| 2016/0127097 A1* | 5/2016 | Chen ................ H04L 5/0051 370/330 |
| 2016/0270038 A1 | 9/2016 | Papasakellariou |
| 2016/0345118 A1* | 11/2016 | Oh .................... H04W 4/70 |
| 2017/0013391 A1 | 1/2017 | Alvarino |
| 2017/0339677 A1* | 11/2017 | Rico Alvarino ...... H04L 5/0091 |
| 2019/0281591 A1* | 9/2019 | Nogami ............ H04W 74/004 |

\* cited by examiner

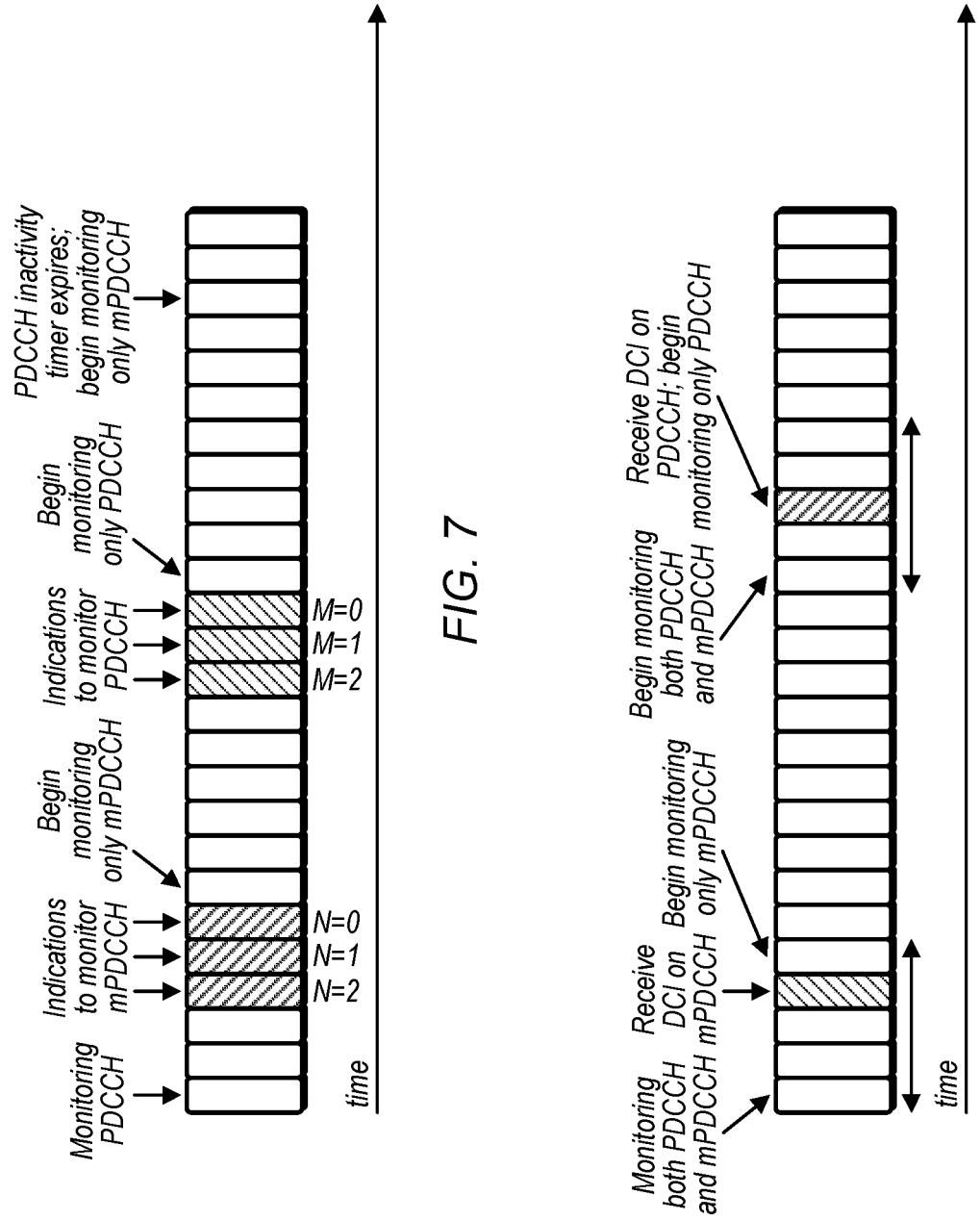

FAST SWITCHING BETWEEN CONTROL CHANNELS DURING RADIO RESOURCE CONTROL CONNECTION

PRIORITY INFORMATION

This application claims priority to U.S. provisional patent application Ser. No. 62/452,531, entitled "Fast Switching Between Control Channels During Radio Resource Control Connection," filed Jan. 31, 2017, which is hereby incorporated by reference in its entirety as though fully and completely set forth herein.

TECHNICAL FIELD

The present application relates to wireless communication, including to techniques for quickly switching between control channels while in a radio resource control connected state in a wireless communication system.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". Many such devices have relatively limited wireless communications capabilities and typically have smaller batteries than larger portable devices, such as smart phones and tablets. In general, it would be desirable to recognize and provide support for the relatively limited wireless communication capabilities of such devices. Therefore, improvements in the field are desired.

SUMMARY

Embodiments are presented herein of, inter alia, systems, apparatuses, and methods for quickly switching between control channels while in a radio resource control connected state, in a wireless communication system.

The techniques described herein may utilize physical layer indications provided by a cellular base station to a wireless device to indicate on which control channel the cellular base station will provide scheduling information to the wireless device for a subsequent period of time. In response to receiving such an indication, a wireless device may monitor (e.g., exclusively) the indicated control channel for the subsequent period of time, e.g., until an indication to utilize a different control channel is received and/or potentially until one or more other possible conditions are met.

Use of physical layer signaling to provide such indications may facilitate a potentially quicker response to the indications than other (e.g., higher layer) types of signaling, at least in some instances. At least according to some embodiments, the potential for quickly switching between a variety of possible control channels (e.g., control channels configured for varying throughput scenarios, coverage conditions, etc.) for a given wireless device may help the wireless device to utilize a control channel with characteristics better suited to its current conditions more of the time.

According to various embodiments, explicit indications (e.g., indications provided in downlink control information) or implicit indications (e.g., configuring a period of time during which a wireless device monitors multiple control channels, and indicating which control channel to use subsequent to that period of time based on which control channel is used during that period of time) may be used for the physical layer indications.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 7-8 illustrate exemplary possible timelines for possible control channel switching configurations, according to some embodiments.

Figure 1:
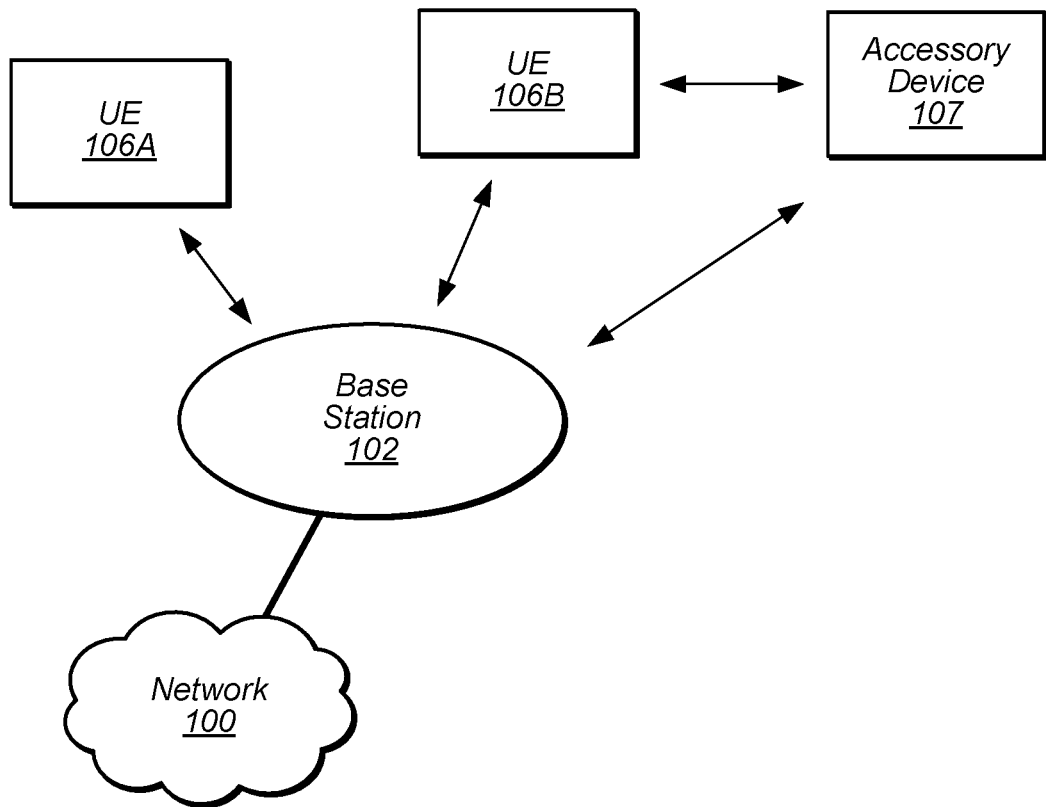
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
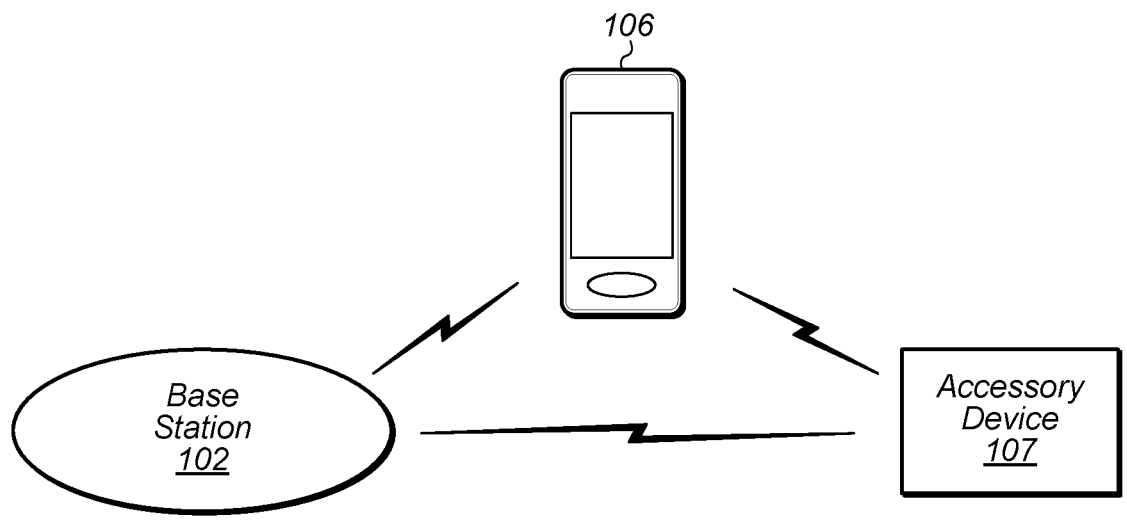
FIG. 2 illustrates an example system where an accessory device can selectively either directly communicate with a cellular base station or utilize the cellular capabilities of an intermediate or proxy device such as a smart phone, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11a, b, g, n, ac, ad, and/or ax, or LTE in an unlicensed band (e.g., LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-B and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of the UE 106B to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

FIG. 2 illustrates an example accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device or intermediate device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include a device or integrated circuit for facilitating cellular communication, referred to as a cellular modem. The cellular modem may include one or more processors (processing elements) and various hardware components as described herein. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible.

The accessory device 107 may be any of various types of devices that, in some embodiments, have a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited or no cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. When the UE 106 is capable of being used by the accessory device 107 as a proxy, the UE 106 may be referred to as a companion device to the accessory device 107.

Figure 3:
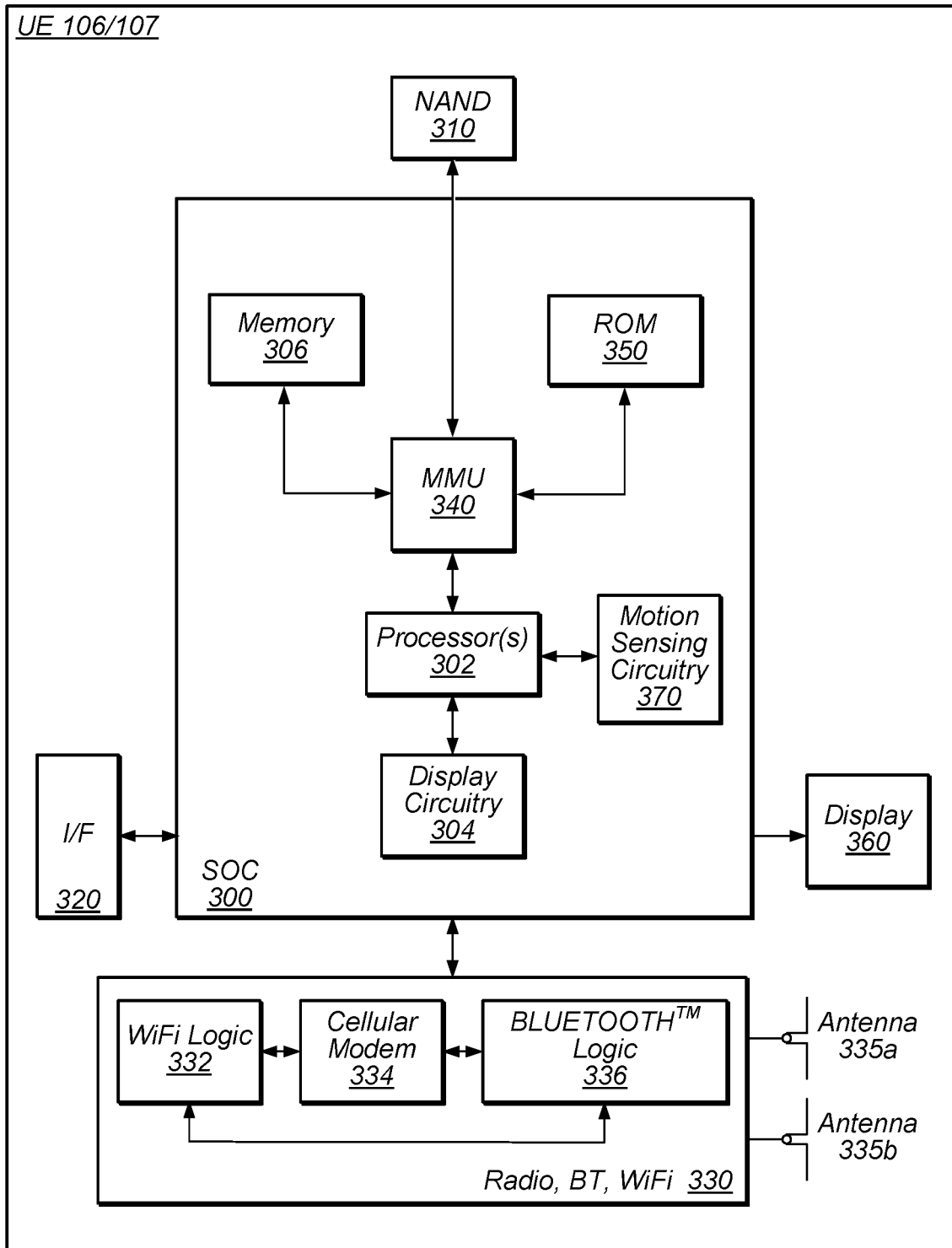
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
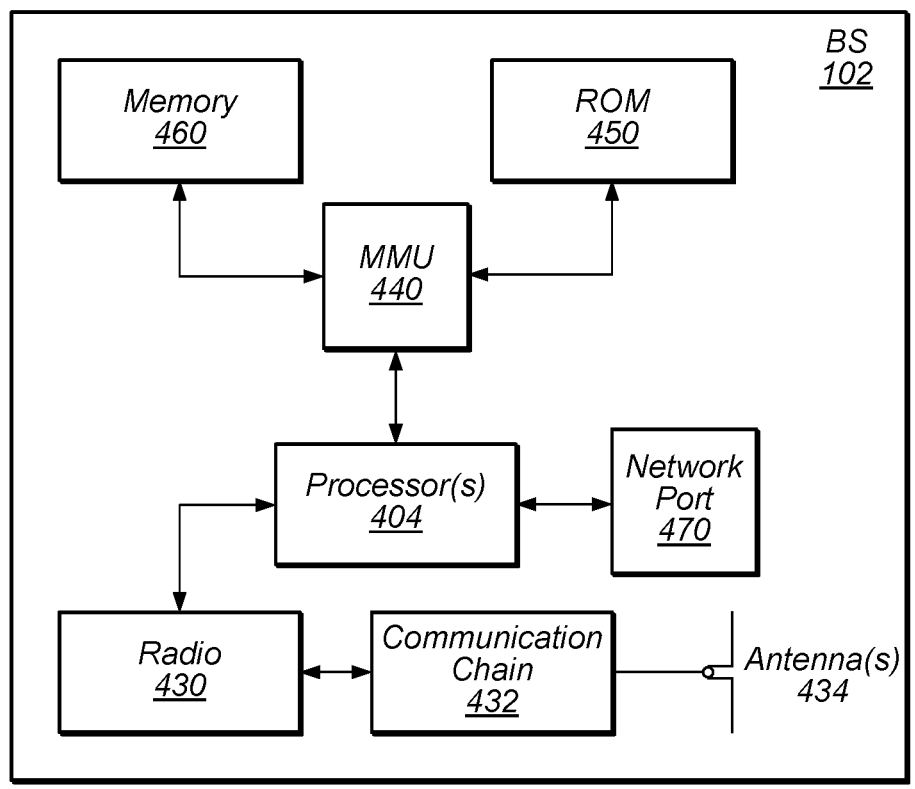
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, 5G-NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

FIGS. 5-8—Example Coverage Modes, Communication Flow Diagram, and Timelines

As cellular communication technologies evolve, an increasing number of cellular communication capable devices are expected to be deployed. One of the reasons for the continuing increase in the numbers of devices includes the development and spread of devices performing machine type communication (MTC). Such devices, which may include stationary deployed devices, wearable devices, and/or other devices forming part of the "Internet of Things", may commonly be designed to perform frequent and/or periodic small data transmissions.

In view of the potentially more limited expected usage scenarios for such devices, devices primarily expected to perform MTC may commonly be lower-complexity devices than many other common cellular devices (e.g., handheld cellular phones, etc.), for example to reduce the size, cost of manufacture, and/or cost to the consumer of such devices. Accordingly, in many instances the communication capability (e.g., number and/or efficiency level of antennas, battery capability, communication range, etc.) of such devices may be relatively limited. For example, many such devices may be considered link budget limited devices.

This may present difficulties in a wireless communication system that primarily supports wireless devices with greater communication capability. Accordingly, at least some wireless communication technologies are being revised and/or developed in a manner to support link budget limited devices (e.g., in addition to those wireless devices that are not link budget limited).

Figure 5:
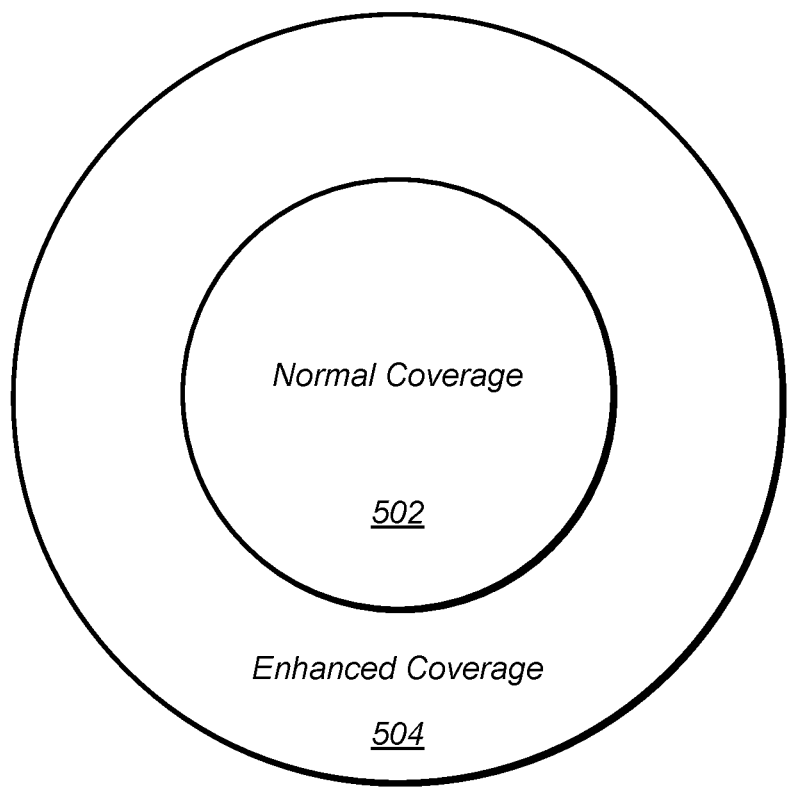
FIG. 5 illustrates examples of possible normal and extended coverage cell ranges, according to some embodiments.

For example, at least some cellular communication systems may be capable of providing multiple coverage modes, e.g., to help accommodate wireless devices with different communication capabilities and/or operating in different radio conditions. Such coverage modes could include a normal coverage mode (e.g., for wireless devices experiencing good radio conditions) along with one or more enhanced coverage modes (e.g., for wireless devices experiencing varying degrees of poorer radio conditions, whether as a result of inherent device capabilities, current conditions, or some combination thereof), as one possibility. FIG. 5 illustrates one example of possible different approximate coverage ranges associated with different coverage modes that could be offered by a cellular base station operating in a cellular communication system. As shown, in this example, the communication range at which normal coverage 502 is available may be smaller than the communication range at which enhanced coverage 504 is available. At least in some instances, any or all of the features of the different coverage modes may differ, including but not limited to communication bandwidth, maximum uplink throughput, maximum downlink throughput, and/or any of various other features.

In many instances a wireless device may predominantly or exclusively operate in just one of the coverage modes offered; for example, a MTC device in a stationary deployment might always operate in an enhanced coverage mode based on its particular combination of device characteristics and typical radio conditions with its serving cell, as one possibility. However, as part of the increasing breadth of device capabilities and intended uses, at least some subset of wireless devices may benefit from being provided the possibility of using different coverage modes at different times. For example, a device may be better served by different coverage modes at different times based on any or all of current radio conditions, a type of communication currently being performed, user preference features currently enabled with respect to power saving and/or other device characteristics, etc. For such devices, providing techniques for switching between different coverage modes may improve operating efficiency, e.g., by extending service coverage range and/or reducing power consumption.

As an example, 3GPP Release 13 defines various categories of UEs, according to which category 1 and above devices may be capable of supporting coverage enhanced (CE) features, and may also be capable of supporting normal mode features.

One feature that may differ between such different coverage modes, at least according to some embodiments, may include a type of control channel that is used to schedule uplink and/or downlink communications for a wireless device. For example, as one possibility, the 3GPP rel. 13 normal coverage mode may typically use a physical downlink control channel (PDCCH) that may span up to 20 MHz to provide uplink and downlink grants to a wireless device, while the 3GPP rel. 13 CE mode may typically use a MTC PDCCH (mPDCCH) that may span 1.4 MHz to provide uplink and downlink grants to a wireless device. In this example, during a normal mode radio resource control (RRC) connection, the PDCCH may be used for physical layer (also referred to as layer 1 or L1) signaling to schedule uplink and downlink grants, uplink hybrid automatic repeat request (HARQ) transmission may be synchronous HARQ, and downlink HARQ transmission may be asynchronous HARQ. Additionally, during a CE mode RRC connection, the mPDCCH may be used for physical layer (L1) signaling to schedule uplink and downlink grants, uplink HARQ transmission may by asynchronous HARQ, and downlink HARQ transmission may be asynchronous HARQ. Note that various additional or alternative control channels may also be possible, such as an enhanced PDCCH (E-PDCCH), among other possibilities. For example, such an E-PDCCH may be wider in bandwidth than the mPDCCH while also being narrower in bandwidth than the PDCCH, according to some embodiments.

Based at least in part on the different bandwidths of the PDCCH and the mPDCCH (and/or other possible control channels), there may be a substantial power usage difference for wireless devices monitoring the PDCCH for receiving scheduling information versus monitoring the mPDCCH for receiving scheduling information. Particularly for the time that a wireless device spends listening to such control channels and not actually receiving uplink or downlink grants, which may be a substantial portion of the total operating time for many wireless devices, there may thus be substantial potential benefit to be gained by having the ability to switch between monitoring a wider band control channel such as the PDCCH (e.g., or E-PDCCH) and monitoring a narrower band control channel such as the mPDCCH.

As one possibility for switching modes during an RRC connection, it may be possible for a wireless device to receive or provide a request from or to the network using a RRC message or media access control (MAC) control element, based on which the network may reconfigure the wireless device to use PDCCH scheduling or mPDCCH scheduling, etc., as desired. However, this type of signaling may be performed at layer 2 (also referred to as L2, and potentially encompassing RRC and MAC), which can increase base station (e.g., eNB) load and increase switching time, such that the potential benefits may not outweigh the costs if such mode switching occurs too frequently.

Figure 6:
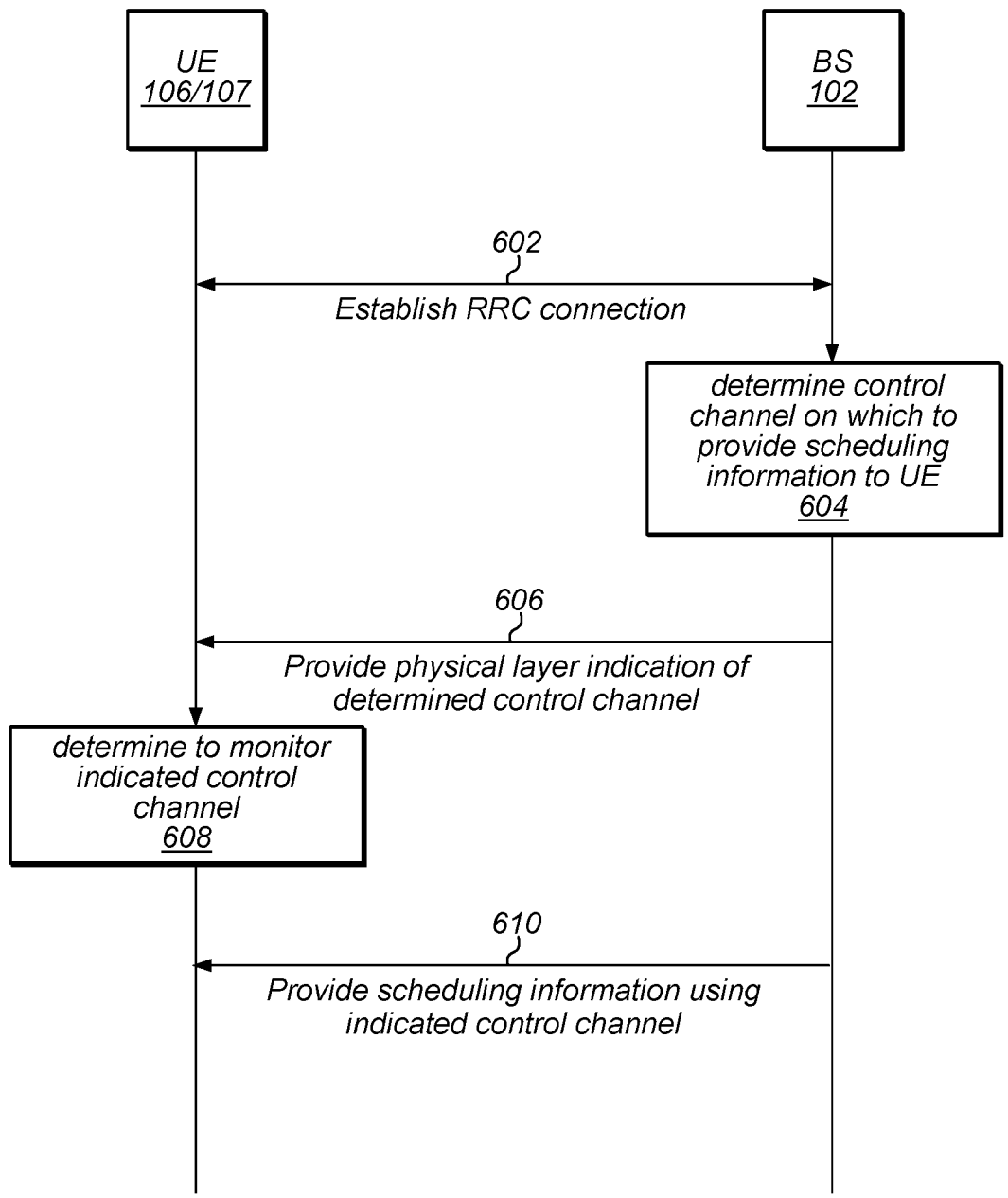
FIG. 6 is a communication flow diagram illustrating an example method for quickly switching between control channels used for providing scheduling information to a UE device, according to some embodiments.

Accordingly, techniques for switching modes during an RRC connection that are faster and/or involve reduced signaling load may improve wireless device operating efficiency, at least according to some embodiments. FIG. 6 is a flowchart diagram illustrating such a method for quickly switching between control channels while in a RRC connected state, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 6 may be implemented by a wireless device, such as a UE 106 or 107 illustrated in and described with respect to FIGS. 1-3 and/or a BS 102 such as illustrated in and described with respect to FIGS. 1, 2, and 4, or more generally in conjunction with any of the computer systems or devices shown in the above Figures, among other devices, as desired. Note that while at least some elements of the method of FIG. 6 are described in a manner relating to the use of communication techniques and/or features associated with LTE and/or 3GPP specification documents, such description is not intended to be limiting to the disclosure, and aspects of the method of FIG. 6 may be used in any suitable wireless communication system, as desired. As shown, the method may operate as follows.

In 602, the UE and the BS may establish a radio resource control connection. The RRC connection may be established after the UE initially camps on a serving cell provided by the cellular base station, according to some embodiments. The serving cell may provide cellular communication service according to a wireless communication technology (or "radio access technology" or "RAT"), such as LTE, 5G-NR, UMTS, CDMA2000, etc. To camp on the serving cell, the wireless device may detect that the serving cell exists, obtain timing synchronization and decode system information for the serving cell, and attach to the cell (e.g., by performing an attachment procedure), according to some embodiments. Other procedures/activities may also or alternatively be used to camp on a serving cell, in various embodiments, e.g., depending on the configuration of the wireless communication system. The RRC connection may be established by way of a random access channel (RACH) procedure performed while operating in an idle mode, according to some embodiments, or in any of various other possible manners.

The serving cell may provide the wireless device with a communication link to a cellular network, such as a core network of a cellular service provider (e.g., with which a user of the wireless device may have a subscription and/or other agreement to provide cellular service). When operating in connected mode with the serving cell, the cellular network may thus provide connectivity between the user device and various services and/or devices coupled to the cellular network, such as other user devices, a public switched telephone network, the Internet, various cloud-based services, etc. A variety of possible data types, with different characteristics, may be transmitted via the serving cell. In addition, various signaling messages may be exchanged at various times to establish, maintain, reconfigure, and/or otherwise provide signaling functionality between the wireless device and the serving cell.

One aspect of connected mode communication between the UE and the BS may include scheduling uplink and downlink grants for the UE. According to some embodiments, this may include the BS providing scheduling information for such uplink and downlink grants to the UE using a control channel, which may potentially be selected from among multiple possible control channels. Thus, in 604, the BS may determine a control channel on which to provide scheduling information to the UE. The control channel may be selected from at least two possible control channels (e.g., including at least a "first" control channel and a "second" control channel). As one possibility, the possible control channels may include a wideband control channel (e.g., a PDCCH, or possibly an E-PDCCH) and a narrowband control channel (e.g., a mPDCCH).

In 606, the BS may provide a physical layer indication of the determined control channel. Providing an indication at the physical layer (L1) may allow for a faster switching time and/or may reduce the network signaling burden, since the signaling may be performed at a lower layer, and in some cases (as further described subsequently herein) may be implicit and thus may not actually require any additional signaling.

In 608, the UE may determine to monitor the indicated control channel for scheduling information, e.g., based at least in part on the physical layer indication provided by the BS. Thus, in some embodiments, for some period of time subsequent to receiving the indication (e.g., until receiving an indication indicating otherwise, or upon expiration of a predetermined period of time after receiving the indication), the UE may monitor only the indicated control channel and may not monitor the other possible control channel(s).

In 610, the BS may provide scheduling information (e.g., including uplink grants and/or downlink grants) to the UE using the indicated control channel. The UE may be monitoring the control channel used by the BS, and may thus receive the scheduling information. The UE and the BS may perform (e.g., uplink and/or downlink) data communication, e.g., in accordance with the scheduling information provided by the BS.

Note that it may be the case that at a subsequent time, the BS and UE may switch to a different control channel. For example, after initially providing scheduling information on the first control channel, the BS may determine to provide scheduling information to the wireless device on the second control channel, or vice versa. In such a case, the BS may again provide a physical layer indication of the selected control channel to the UE, and may provide scheduling information to the wireless device using the indicated control channel. The UE may, in turn, receive such an indication that the control channel to be used for providing scheduling information to the UE is changing, begin monitoring the newly indicted control channel accordingly, and thus receive the scheduling information provided on the newly indicted control channel.

There may be multiple possible mechanisms for providing the physical layer indication of the control channel selected for providing scheduling information to the UE. One such possible mechanism may include an explicit indication of which control channel is to be used for scheduling information. For example, in a 3GPP context, additional bits may be added to an existing downlink control information (DCI) format or a new DCI format may be defined for indicating a change in control channel used for providing scheduling information.

In such a case, when the UE is currently using the PDCCH to listen for scheduling information, if the network decides to switch to mPDCCH scheduling, the network may provide an indication that a switch in control channel used for scheduling information will occur in a certain number ("N") of subframes, for each of the next N subframes until the switch occurs. The value of N may count down from its initial value by 1 for every subframe, until N reaches 0, at which point the switch to mPDCCH scheduling may begin.

Similarly, when the UE is currently using the mPDCCH to listen for scheduling information, if the network decides to switch to PDCCH scheduling, the network may provide an indication that a switch in control channel used for scheduling information will occur in a certain number ("M") of subframes, for each of the next M subframes until the switch occurs. The value of M may count down from its initial value by 1 for every subframe, until M reaches 0, at which point the switch to PDCCH scheduling may begin.

The repeating indications over N or M subframes may help prevent the possibility of a UE missing the indication to switch which control channel is used for scheduling information as a result of unsuccessful PDCCH or mPDCCH decoding, according to some embodiments. As an alternative or additional possibility, however, it may be possible for a UE to send an acknowledgement (e.g., using the physical uplink control channel (PUCCH) or physical uplink shared channel (PUSCH) for the uplink communication) in response to an indication in DCI that the network is switching between using the PDCCH and the mPDCCH for scheduling information. In this case, the network may not implement the switch in scheduling between the PDCCH and mPDCCH until the network receives the acknowledgement.

As another possible mechanism for providing the physical layer indication of the control channel selected for providing scheduling information to the UE, an implicit indication may be used. For example, during RRC connection setup or RRC connection reconfiguration, it may be possible for the network to configure the UE with a periodic cycle according to which the UE occasionally listens to both the PDCCH and the mPDCCH (and/or potentially the E-PDCCH or one or more other control channels, if configured), and determines which control channel to monitor until the next such dual-monitoring portion of the cycle based on which (if any) control channel is used by the network to provide scheduling information during that dual-monitoring portion of the cycle. Such a dual-monitoring or dual-listening portion may be possible, at least in some LTE embodiments, since the PDCCH may typically be transmitted on the first 1-3 symbols (e.g., control space) of an LTE subframe, while the mPDCCH may be transmitted on the symbols not used by the physical control format indicator channel (PCFICH) and PDCCH (e.g., user space), such that a CE capable UE may be able to decode both the PDCCH and the mPDCCH in one subframe.

The overall cycle length, and the dual-monitoring portion of the cycle, may be configured with any desired lengths of time, potentially including different lengths depending on whether the UE is currently in the PDCCH mode or the mPDCCH mode. For example, as one non-limiting possibility, in the PDCCH scheduling mode, a UE may be configured to listen to both the PDCCH and the mPDCCH during a 10 ms portion of a 100 ms cycle, while in the mPDCCH scheduling mode, a UE may be configured to listen to both the PDCCH and the mPDCCH during a 10 ms portion of a 200 ms cycle. Other values (e.g., longer or shorter values, for either or both of the overall cycle length or the dual listening portion, and for either or both of PDCCH scheduling mode or mPDCCH scheduling mode) are also possible.

In such a scenario, when the UE is in the PDCCH mode, during the period of listening to both the PDCCH and the mPDCCH, the UE may first decode the PDCCH, e.g., using a dual antenna or single antenna configuration. If there are any uplink or downlink grants scheduled for the UE on the PDCCH in a subframe, the UE may determine to remain in PDCCH mode and may not listen to the mPDCCH at all. If there are no grants scheduled for the UE on the PDCCH in a subframe, the UE may then decode the mPDCCH. Note that the UE may be able to switch its RF front end from a wideband configuration (e.g., up to 20 MHz) to a narrowband configuration (e.g., 1.4 MHz or 6 physical resource blocks (PRBs)) and a single antenna configuration to decode the mPDCCH after determining that no scheduling information is received on the PDCCH. If there are any uplink or downlink grants scheduled for the UE on the mPDCCH in the subframe, the UE may determine to switch to the mPDCCH mode. This dual monitoring procedure may be performed for each subframe in the dual-monitoring period until an uplink or downlink grant is scheduled or until the dual monitoring period ends. If there are no grants provided on either of the PDCCH or the mPDCCH during the dual-monitoring period, the UE may also switch to the mPDCCH mode. When in the PDCCH mode and not in the dual-monitoring period, the UE may listen only to the PDCCH for uplink and downlink grants (e.g., the UE may not listen to the mPDCCH when operating in PDCCH mode and not in the dual-monitoring period).

Similarly, when the UE is in the mPDCCH mode, during the period of listening to both the PDCCH and the mPDCCH, the UE may first decode the PDCCH, e.g., using a dual antenna or single antenna configuration. If there are any uplink or downlink grants scheduled for the UE on the PDCCH in a subframe, the UE may determine to switch to the PDCCH mode and may not listen to the mPDCCH at all (e.g., until the next dual monitoring period). If there are no grants scheduled for the UE on the PDCCH in a subframe, the UE may then decode the mPDCCH, possibly including reconfiguring its RF front end for mPDCCH decoding. If there any uplink or downlink grants scheduled for the UE on the mPDCCH in the subframe, the UE may determine to remain in the mPDCCH mode. This dual monitoring procedure may be performed for each subframe in the dual-monitoring period until an uplink or downlink grant is scheduled or until the dual monitoring period ends. If there are no grants provided on either of the PDCCH or the mPDCCH during the dual-monitoring period, the UE may also remain in the mPDCCH mode. When in the mPDCCH mode and not in the dual-monitoring period, the UE may listen only to the mPDCCH for uplink and downlink grants (e.g., the UE may not listen to the PDCCH when operating in mPDCCH mode and not in the dual-monitoring period).

According to some embodiments, in such a scenario, regardless of whether the UE is operating in PDCCH mode or mPDCCH mode, the UE may still follow a connected mode discontinuous reception (CDRX) configuration. For example, when a DRX inactive timer for the UE expires, the UE may enter CDRX mode. When the UE subsequently wakes up (e.g., for its CDRX on-duration, based on its CDRX wakeup configuration), the UE may initially utilize a dual-monitoring period in which it listens to both PDCCH and mPDCCH for a period of time configured by the network, e.g., in order to determine which control channel to monitor for scheduling information going forward. For example, similar to the dual-monitoring period when in PDCCH or mPDCCH mode, the UE may first decode the PDCCH, e.g., using a dual antenna or single antenna configuration. If there are any uplink or downlink grants scheduled for the UE on the PDCCH in a subframe, the UE may determine to enter the PDCCH mode and may not listen to the mPDCCH at all (e.g., until the next CDRX on-duration or other configured dual-monitoring period). If there are no grants scheduled for the UE on the PDCCH in a subframe, the UE may then decode the mPDCCH, possibly including reconfiguring its RF front end for mPDCCH decoding. If there any uplink or downlink grants scheduled for the UE on the mPDCCH in the subframe, the UE may determine to enter the mPDCCH mode. This dual monitoring procedure may be performed for each subframe in the dual-monitoring period until an uplink or downlink grant is scheduled or until the dual monitoring period ends. If there are no grants provided on either of the PDCCH or the mPDCCH during the dual-monitoring period, the UE may also enter the mPDCCH mode.

As an additional or alternative possible mechanism for supporting switching control channels with relatively minimal control signaling, in some embodiments one or more control channel inactivity timers may be configured for a wireless device. If such a control channel inactivity timer is configured, and the wireless device does not receive any control information (e.g., uplink or downlink grants) for the duration of the control channel inactivity timer, the wireless device may switch to an alternative (e.g., default) control channel to monitor for control information. If the wireless device does receive control information on the control channel associated with the control channel inactivity timer prior to expiration of the control channel inactivity timer, the control channel inactivity timer may be restarted, which may extend the duration for which the wireless device is configured to monitor that control channel.

For example, as one possibility, a PDCCH inactivity timer may be configured while the UE is configured to monitor the PDCCH (e.g., as part of a PDCCH-only mode or during a dual or multiple control channel monitoring period), and upon expiration of the PDCCH inactivity timer, the UE may autonomously switch to monitoring (e.g., only) the mPDCCH. In such a case, the UE may continue to monitor (e.g., only) the mPDCCH until the CDRX inactivity timer (if CDRX is configured) expires and the UE enters a sleep mode, until the BS sends the UE a new indication (e.g., on the mPDCCH) to switch back to the PDCCH, and/or until another configured condition is met. In a scenario in which CDRX is configured, if the CDRX inactivity timer does expire, after sleeping and during the next wakeup (e.g., on-duration) period, the UE may continue to monitor the mPDCCH, or may operate in a dual or multiple monitoring mode such as previously described herein, e.g., depending on the configuration.

Note that configuration parameters/settings for such a control channel inactivity timer mechanism may include statically configured parameters/settings (e.g., that are fixed in Standard specification documents) and/or dynamically configured parameters/settings (e.g., that are signaled between the wireless device and the network, for example using RRC configuration/reconfiguration messages), according to various embodiments.

FIGS. 7-8 show exemplary timelines illustrating scenarios that might occur in possible configurations with explicit and implicit physical layer indications of which control channel to use, respectively, such as according to certain of the configurations described previously herein with respect to FIG. 6.

FIG. 7 illustrates an exemplary timeline in which explicit physical layer signaling can be used to indicate whether to monitor (e.g., only) the PDCCH or to monitor (e.g., only) the mPDCCH, according to some embodiments. As shown, a UE may initially be configured to monitor the PDCCH. The UE may receive indications (e.g., via the PDCCH) to monitor the mPDCCH in multiple subframes prior to the actual switch to use of the mPDCCH (e.g., 3 indications, in the illustrated scenario), with each indication counting down the number of subframes remaining until the switch will occur. Beginning with the indicated subframe, the UE may monitor (e.g., only) the mPDCCH. The UE may continue to monitor the mPDCCH until one or more indications to switch to monitoring the PDCCH are received. Similarly, the UE may receive indications (e.g., via the mPDCCH) to monitor the PDCCH in multiple subframes prior to the actual switch to use of the PDCCH (e.g., 3 indications, in the illustrated scenario), with each indication counting down the number of subframes remaining until the switch will occur. Beginning with the indicated subframe, the UE may monitor (e.g., only) the PDCCH.

If desired, such explicit indications to switch control channels may be the only configured mechanism for switching between control channels. Note, however, that as an alternative or additional possible mechanism, a PDCCH inactivity timer may also be used, if desired. For example, as also shown in FIG. 7, the UE may utilize a PDCCH inactivity timer, and if it expires (e.g., if no control information is provided to the UE on the PDCCH for the duration of the PDCCH inactivity timer), the UE may switch to monitoring (e.g., only) the mPDCCH, as illustrated.

Note also that while FIG. 7 illustrates a scenario in which multiple indications counting down to a scheduled control channel switch are used, configurations in which a UE instead or additionally responds to an indication of a control channel switch with an acknowledgement to confirm the indicated control channel switch, such as previously described herein, are also possible.

FIG. 8 illustrates an exemplary timeline in which implicit physical layer signaling can be used to indicate whether to monitor (e.g., only) the PDCCH or to monitor (e.g., only) the mPDCCH, according to some embodiments. As shown, a UE may initially be monitoring both the PDCCH and the mPDCCH, e.g., as part of a dual-monitoring period. During one of the subframes of the dual-monitoring period, the UE may receive downlink control information via the mPDCCH. Based on this implicit indication, the UE may subsequently monitor (e.g., only) the mPDCCCH. The UE may continue to monitor the mPDCCH until the next configured dual-monitoring period, as shown, at which time the UE may begin monitoring both the PDCCH and the mPDCCH. In the illustrated example, the UE may during one of the subframes of the dual-monitoring period receive downlink control information via the PDCCH. Based on this implicit indication, the UE may subsequently monitor (e.g., only) the mPDCCCH. Note that at least according to some embodiments, in the case of receiving an implicit indication to monitor the PDCCH, the UE may be able to begin monitoring only the PDCCH in the same subframe as the indication is received, e.g., since the mPDCCH may be provided later in the same subframe, as shown. As also shown, in the case of receiving an implicit indication to monitor the mPDCCH, the UE may not be able to begin monitoring only the mPDCCH until the following subframe, e.g., since the UE may have already listened to the earlier-provided PDCCH in that subframe, at least according to some embodiments.

Note that the techniques described herein may be used just for quickly switching between control channels used for providing scheduling information to a UE, or more broadly for switching between operating modes, among various possibilities. For example, when operating in PDCCH mode as described herein, a UE may also more generally operate in a normal coverage mode, potentially including implicitly configuring the UE and BS to implement one or more additional features associated with the normal mode. Similarly, when operating in mPDCCH mode as described herein, a UE may also more generally operate in an enhanced coverage mode, potentially including implicitly configuring the UE and BS to implement one or more additional features associated with the enhanced coverage mode.

Additional Information

The following information includes possible details of LTE release 13 enhanced coverage mode characteristics and parameters, is provided for exemplary illustrative purposes, and is not intended to be limiting to this disclosure as a whole.

A wireless device may be categorized according to its device category with respect to LTE, according to some embodiments. For example, consider a category 1 LTE device, e.g., a device that is UL Category 1 and DL category 1. For such a device, a e-HARQ-pattern-FDD-r12 parameter may define whether the UE supports an enhanced HARQ pattern for TTI bundling operation for FDD, e.g., with 4 TTI bundling, 3 HARQ processes, and round trip time (RTT) of 12 ms. A ce-ModeA-r13 parameter may define whether the UE supports operation in CE mode A and PRACH CE level 0 and 1 at Random Access. A intraFreqA3-CE-ModeA-r13 parameter may define whether the UE when operating in CE mode A supports eventA3 for intra neighboring cells in normal coverage and CE mode A. A intraFreqHO-CE-ModeA-r13 parameter may define whether the UE when operating in CE mode A supports intra handover to target cells in normal coverage and CE mode A.

A new 32 bits signature in a MIB provided by a cell may be used to indicate if CE SIB1 is scheduled and its transport block size and number of repetitions. Such a signature may indicate that the cell supports CE features defined by 3GPP R13; a signature value of 0 may mean that the CE feature is not supported.

If CE features are supported by the cell, a CE SIB1 for Coverage Enhancement may be provided by the cell. A larger SI window length and repetition pattern may be used for CE SIBs. A narrow band (e.g., contiguous 6PRBs) and transport block size may also be used for CE SIBs. Additionally, a frequency hopping configuration may be used for CE SIBs. A CE SIB2 for Coverage Enhancement may also be provided. The CE SIBs may indicate CE PRACH configurations and CE mPDCCH/PDSCH/PUSCH/PCH common configurations.

Each CE level supported by a serving cell may be associated with a set of PRACH resources for transmission of Random Access Preambles. The CE level for a UE may be selected based on serving cell RSRP measurement and CE SIB2 rsrp-ThresholdsPrachInfoList. The maximum number of preamble transmission attempts (3/4/5/6/7/8/10) per each CE level may be provided by the CE SIB2. The number of repetitions (1/2/4/8/16/32/64/128) required for preamble transmission per attempt for each CE level may also be provided by the CE SIB2. Additionally, the narrow bands to monitor for the mPDCCH for a RAR in each CE level, the number of repetitions for mPDCCH common search space for RAR, msg3 and msg4, and the RA response window size and contention resolution Timer per CE level may all be provided by the CE SIB2.

If a UE is in enhanced coverage, it shall select a PRACH preamble for random access based on its corresponding CE level. The UE may transmit a preamble with corresponding number of repetitions, RA_RNTI, preamble ind and target power.

If the UE fails on max number of random access attempts on one CE level, it shall try to random access on next CE level.

The msg3 PUSCH repetition number may be indicated in the RAR received from the network.

A parameter PUCCH-NumRepetitionCE may provide a number of PUCCH repetitions for PUCCH format 1/1a/2/2a/2b for CE mode A.

A parameter PUCCH-numRepetitionCE-msg4-level0/1/2/3 may provide a number of repetitions for PUCCH carrying HARQ response to PDSH containing msg4 for PRACH CE level 0/1/2/3.

One paging occasion (PO) in a CE mode may include a subframe in which a P-RNTI is transmitted on the mPDCCH. The subframe may be determined by the UE based on its IMSI, DRX cycle, and number of paging narrow bands (Nn) provided in CE SIB2.

The mPDCCH carrying a PO can be repeated multiple times, e.g., as defined by the parameter mPDCCH-Num-Repetition-Paging-R13 in CE SIB2.

Information on the coverage enhancement (CE) level, if available for the UE, may be provided transparently by the serving eNB to the MME at transition to ECM_IDLE together with the respective cell identifier, and may be provided to the E-UTRAN during paging. Paging attempt information may always be provided to all paged eNBs for UEs for which the information on the coverage enhancement level has been received.

If paging attempt information is included in the paging message, each paged eNB may receive the same information during a paging attempt. The paging attempt count may be increased by one at each new paging attempt. The next paging area scope, when present, indicates whether the MME plans to modify the paging area currently selected at next paging attempt. If the UE has changed its mobility state to ECM CONNECTED the Paging Attempt Count is reset.

A PUSCH transmission in an enhanced coverage mode can be in a N-subframe TTI bundle indicated by mPDCCH. A parameter PUSCH-maxNumRepetitionCEmodeA-r13, having a value of 8/16/32, may indicate a maximum value to indicate the set of PUSCH repetition numbers for CE mode A, e.g., among the following possibilities: {1, 2, 4, 8}, {1, 4, 8, 16}, {1, 4, 16, 32}. A parameter PUSCH-maxNum-RepetionCEmodeB-r13, having a value of 192/256/ . . . /2048, may indicate a maximum value to indicate the set of PUSCH repetition numbers for CE mode B. The PUSCH bandwidth may be limited to 6PRB, according to some embodiments. Uplink HARQ operation may be asynchronous for UEs in enhanced coverage except for the receptions within a bundle.

A PDSCH transmission in an enhanced coverage mode can be in a N-subframe TTI bundle indicated by mPDCCH. A parameter PDSCH-maxNumRepetionCEmodeA-r13, having a value of 8/16/32, may indicate a maximum value to indicate the set of PDSCH repetition numbers for CE mode A, e.g., among the following possibilities: {1, 2, 4, 8}, {1, 4, 8, 16}, {1, 4, 16, 32}. A parameter PDSCH-maxNum-RepetionCEmodeB-r13, having a value of 192/256/ . . . /2048, may indicate a maximum value to indicate the set of PDSCH repetition number for CE mode B. The PDSCH bandwidth may be limited to 6PRB, according to some embodiments.

The mPDCCH provided in an enhanced coverage mode may utilize a repetition level among the following repetition levels: {1, 2, 4, 8, 16, 32, 64, 128, 256}. The mPDCCH aggregation level may be among the following aggregation levels: {1, 2, 4, 8, 16, 12, 24}. The mPDCCH bandwidth may be limited to 6PRB, according to some embodiments.

An existing NW configuration for VoLTE may include PUSCH 4TTIB, 4HARQ, HARQ RTT 16 ms, with one/two audio packet bundling, TBS 208 bits/328 bits, segment 144/176 bits, 4 HARQ transmissions. An increase in HARQ transmissions from 4 to 7 could result in a link budget gain (e.g., ~2 dB, as one possibility).

A possible mPDCCH/PUSCH configuration in CE mode A could include PUSCH 8TTIB, 3 HARQ, HARQ RTT 24 ms, mPDCCH with 4 repetitions. For one audio packet bundling, TBS 208 bits, segment 144/176 bits, 5/6/7 HARQ transmissions could be used. For two audio packet bundling, TBS 328 bits, segment 144/176 bits, 5/6/7 HARQ transmissions could be used. This may provide a potential UL link budget gain of ~4-5 dB, as one possibility.

Another possible mPDCCH/PUSCH in CE mode A could include PUSCH 8TTIB, 2 HARQ, HARQ RTT 16 ms, mPDCCH with 2 repetitions. For one audio packet bundling, TBS 208 bits, segment 144/176 bits, HARQ 8/9/10 transmissions could be used. For two audio packet bundling, TBS 328 bits, segment 144/176 bits, HARQ 8/9/10 transmissions could be used. This may provide a potential UL link budget gain of ~6 dB-7 dB, as one possibility.

Another possible mPDCCH/PUSCH in CE mode A could include PUSCH 4TTIB, 3 HARQ, HARQ RTT 12 ms, mPDCCH with 2 repetitions. For one audio packet bundling, TBS 208 bits, segment 144/176 bits, HARQ 10/11/12 transmissions could be used. For two audio packet bundling, TBS 328 bits, segment 144/176 bits, HARQ 10/11/12 transmissions could be used. This may provide a potential UL link budget gain of ~4 dB-5 dB, as one possibility.

For a UE with category 1 and above, when in a coverage beyond normal coverage, in order to not go out-of-service (OOS), it may be possible for a wireless device to dynamically utilize coverage enhancement feature if it is supported by eNodeB. As part of such techniques, when a cell is selected as serving cell to camp on, a UE may determine if the cell supports the 3GPP R13 coverage enhancement feature by checking if the CE signature present in MIB. If CE is supported on the serving cell, the UE may store CE SIBS for CE level thresholds, CE PRACH and mPDCCH configurations.

When in idle mode, based on serving cell measurements, the UE may determine if it is in normal coverage or enhanced coverage and its corresponding CE level. If the UE is entering enhanced coverage from normal coverage, UE may utilize the configuration information from the CE SIBs to establish a mobility management connection (perform a TAU or send any other MM message) to update its MME to switch to CE mode idle paging. The UE may switch to listen to the mPDCCH for idle paging. When the MME eventually pages the UE, the MME may send the UE's CE level information and page attempt count information to a group of eNodeBs. Each eNodeB in the group may thus determine to page the UE on the mPDCCH if the UE is in enhanced coverage, and may otherwise page the UE on the PDCCH. Additionally, the UE's intra/inter cell re-selection may be based on cell selection criterion S for enhanced coverage (e.g., instead of cell selection criterion S for normal coverage).

If the UE is entering normal coverage from enhanced coverage, the UE may continue to listen to the mPDCCH for idle paging, or may establish a mobility management connection (e.g., perform a TAU) to update MME to switch to normal mode idle paging, in which case the UE may switch to listen to the PDCCH for idle paging. Additionally, its intra/inter cell re-selection may be based on cell selection criterion S for normal coverage (e.g., instead of cell selection criterion S for enhanced coverage).

When establishing an RRC connection, if the UE is in normal coverage, it may select a PRACH preamble for normal coverage for performing a random access procedure. If the UE is in enhanced coverage, it may select a PRACH preamble from the corresponding enhanced coverage level for performing a random access procedure.

When exiting an RRC connection, if the UE is in normal coverage, it may enter idle mode in normal coverage, read normal SIBs, and listen to the PDCCH for idle paging. If the UE is in enhanced coverage, it may enter idle mode in enhanced coverage, read CE SIBS, and listen to the mPDCCH for idle paging.

During an RRC connection, if the UE is entering enhanced coverage from normal coverage, the UE may use a PRACH preamble from its corresponding CE level to re-establish the RRC connection; or, alternatively, the NW may reconfigure the RRC connection to use the mPDCCH, e.g., based on a UE triggered measurement report. If the UE is entering normal coverage from enhanced coverage, the UE may use a PRACH preamble for normal coverage to re-establish the RRC connection; or, alternatively, the may NW reconfigure the RRC connection to use the PDCCH, e.g., based on a UE triggered measurement report. The network may also perform same-cell handover using a dedicated PRACH preamble for enhanced coverage to switch the UE to use of the mPDCCH during the RRC connection; or, conversely, the network may use a dedicated PRACH preamble for normal coverage to switch the UE to use of the PDCCH during the RRC connection. Further, the NW may perform NW triggered HO from a cell in enhanced coverage to a cell in normal coverage, or a cell in normal coverage to a cell in enhanced coverage. The UE may trigger RRC re-establishment to a cell in normal coverage from a cell in enhanced coverage, or from a cell in normal coverage to a cell in enhanced coverage. Additionally, the network may use the RRC connection release message to indicate to a UE whether to operate in normal coverage mode or enhanced coverage mode after the RRC connection is released.

In the following further exemplary embodiments are provided.

One set of embodiments may include a method, comprising: by a wireless device: establishing a radio resource control (RRC) connection with a cellular base station; determining to monitor a first control channel for scheduling information based at least in part on a physical layer indication from the cellular base station, wherein the first control channel is selected from at least two possible control channels; and monitoring the first control channel for scheduling information.

According to some embodiments, the method further comprises: receiving a physical layer indication from the cellular base station indicating to monitor a second control channel for scheduling information; and monitoring the second control channel for scheduling information.

Another set of embodiments may include a method, comprising: by a cellular base station: establishing a radio resource control (RRC) connection with a wireless device; determining to provide scheduling information to the wireless device using a first control channel, wherein the first control channel is selected from at least two possible control channels; providing a physical layer indication to monitor the first control channel for scheduling information to the wireless device; and providing scheduling information to the wireless device using the first control channel.

According to some embodiments, the method further comprises: determining to provide scheduling information to the wireless device on a second control channel; providing a physical layer indication to monitor the second control channel for scheduling information to the wireless device; and providing scheduling information to the wireless device using the second control channel.

According to some embodiments, the physical layer indication comprises an explicit indication comprised in downlink control information (DCI) provided to the wireless device by the cellular base station.

According to some embodiments, the physical layer indication specifies a number of subframes until use of the indicated control channel goes into effect.

According to some embodiments, the wireless device is configured to provide an acknowledgement to the cellular base station in response to the physical layer indication.

According to some embodiments, the physical layer indication comprises an implicit indication based at least in part on which control channel is used to provide scheduling information to the wireless device by the cellular base station during a period of time in which the wireless device is configured to monitor all of the at least two possible control channels.

According to some embodiments, the wireless device is configured to monitor a specified control channel of the at least two possible control channels if no scheduling information is provided to the wireless device by the cellular base station during the period of time in which the wireless device is configured to monitor all of the at least two possible control channels.

According to some embodiments, the at least two possible control channels comprise: a third generation partnership project (3GPP) compliant physical downlink control channel (PDCCH); and a 3GPP compliant machine type communication (MTC) PDCCH (mPDCCH).

A still further exemplary set of embodiments may include an apparatus, comprising a processing element configured to cause a device to implement any or all parts of the preceding examples.

Another exemplary set of embodiments may include a device, comprising: an antenna; a radio coupled to the antenna; and a processing element operably coupled to the radio, wherein the device is configured to implement any or all parts of the preceding examples.

A yet further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a wireless device to:
establish a radio resource control (RRC) connection with a cellular base station;
receive scheduling information on a first control channel associated with a first bandwidth;
receive a physical layer indication via the first control channel associated with the first bandwidth comprising an explicit indication in downlink control information (DCI) from the cellular base station specifying that a second control channel associated with a second bandwidth is to be used for providing scheduling information to the wireless device; and
in response to the physical layer indication, monitor only the second control channel associated with the second bandwidth for scheduling information.

2. The apparatus of claim 1, wherein the processor is further configured to cause the wireless device to:
receive a second physical layer indication from the cellular base station indicating to monitor the first control channel for scheduling information; and
monitor the first control channel for scheduling information.

3. The apparatus of claim 1,
wherein the physical layer indication specifies a number of subframes until use of the indicated control channel goes into effect.

4. The apparatus of claim 1, wherein the processor is further configured to cause the wireless device to:
provide an acknowledgement to the cellular base station in response to the physical layer indication.

5. The apparatus of claim 2,
wherein the second physical layer indication comprises an implicit indication based at least in part on which control channel is used to provide scheduling information to the wireless device by the cellular base station during a period of time in which the wireless device is configured to monitor both of the first and second control channels.

6. The apparatus of claim 5, wherein the processor is further configured to cause the wireless device to:
monitor a specified control channel of the first and second control channels if no scheduling information is provided to the wireless device by the cellular base station during the period of time in which the wireless device is configured to monitor both of the first and second control channels.

7. The apparatus of claim 1, wherein the processor is further configured to cause the wireless device to:
restart a control channel inactivity timer in response to receiving control information on the second control channel; and
upon expiration of the control channel inactivity timer, automatically switch to monitor the first control channel for scheduling information.

8. The apparatus of claim 1, wherein the first and second control channels comprise:
a third generation partnership project (3GPP) compliant physical downlink control channel (PDCCH); and
a 3GPP compliant machine type communication (MTC) PDCCH (mPDCCH).

9. A cellular base station, comprising:
an antenna;
a radio coupled to the antenna; and
a processor coupled to the radio;
wherein the cellular base station is configured to:
establish a radio resource control (RRC) connection with a wireless device;
determine to provide scheduling information to the wireless device using a first control channel associated with a first bandwidth, wherein the first control channel associated with the first bandwidth is selected from the first control channel associated with the first bandwidth and a second control channel associated with a second bandwidth;
provide scheduling information for the wireless device using the first control channel associated with the first bandwidth;
determine to provide scheduling information to the wireless device using the second control channel associated with the second bandwidth;
provide a physical layer indication via the first control channel associated with the first bandwidth comprising an explicit indication in downlink control information (DCI) specifying that the second control channel associated with the second bandwidth is to be used for providing scheduling information to the wireless device; and provide scheduling information for the wireless device using the second control channel associated with the second bandwidth, wherein said providing the scheduling information using the second control channel associated with the second bandwidth is performed instead of providing the scheduling information using the first control channel associated with the first bandwidth.

10. The cellular base station of claim 9, wherein the cellular base station is further configured to:
determine to provide scheduling information to the wireless device on the first control channel;
provide a second physical layer indication to monitor the first control channel for scheduling information to the wireless device; and
provide scheduling information to the wireless device using the first control channel.

11. The cellular base station of claim 9,
wherein physical layer indication specifies a number of subframes until use of the indicated control channel goes into effect.

12. The cellular base station of claim 11, wherein the cellular base station is further configured to:
receive an acknowledgement from the wireless device in response to the physical layer indication.

13. The cellular base station of claim 10, wherein the second physical layer indication comprises an implicit indication, wherein to provide the physical layer indication, the cellular base station is further configured to:
provide scheduling information to the wireless device using the first control channel during a period of time in which the wireless device is configured to monitor both of the first and second control channels.

14. The cellular base station of claim 10, wherein the cellular base station is further configured to:
provide control channel inactivity timer configuration information to the wireless device for the second control channel,
wherein said providing the second physical layer indication comprises refraining from providing control information to the wireless device via the second control channel for a duration of the control channel inactivity timer.

15. A wireless device, comprising:
an antenna;
a radio coupled to the antenna; and
a processor coupled to the radio;
wherein the wireless device is configured to:
establish a radio resource control (RRC) connection with a cellular base station;
receive scheduling information on a first control channel associated with a first bandwidth;
receive a physical layer indication, via the first control channel associated with the first bandwidth, to monitor a second control channel associated with a second bandwidth for scheduling information, wherein the physical layer indication comprises an explicit indication in downlink control information (DCI) from the cellular base station specifying that the second control channel associated with the second bandwidth is to be used for providing scheduling information to the wireless device; and
monitor the second control channel associated with the second bandwidth for scheduling information, instead of the first control channel associated with the first bandwidth, based on the physical layer indication to monitor the second control channel associated with the second bandwidth for scheduling information.

16. The wireless device of claim 15, wherein the wireless device is further configured to, at a later time:
receive a second physical layer indication to monitor the first control channel for scheduling information; and
monitor the first control channel for scheduling information instead of the second control channel based at least in part on the physical layer indication to monitor the second control channel for scheduling information.

17. The wireless device of claim 15, wherein the wireless device is further configured to:
monitor both the first and second control channels during a specified period of time;
receive scheduling information on the first control channel during the specified period of time, wherein receiving the scheduling information on the first control channel during the specified period of time comprises the physical layer indication to monitor a first control channel; and
determine to monitor the first control channel for scheduling information for a period of time subsequent to the specified period of time based at least in part on receiving the scheduling information on the first control channel during the specified period of time.

18. The wireless device of claim 15,
wherein the wireless device does not monitor control channels other than the second control channel for a period of time after receiving the physical layer indication to monitor the second control channel.

19. The wireless device of claim 15, wherein the wireless device is further configured to:
restart a control channel inactivity timer in response to receiving control information on the second control channel; and
upon expiration of the control channel inactivity timer, automatically switch to monitor the first control channel for scheduling information.

20. The cellular base station of claim 9, wherein the cellular base station is further configured to:
provide control channel inactivity timer configuration information to the wireless device for the second control channel, wherein in response to no control information provided to the UE on the second control channel for the duration of a control channel inactivity timer according to the control channel inactivity timer configuration information, determine the wireless devices has automatically switched to monitoring the first control channel for scheduling information upon expiration of the control channel inactivity timer.

* * * * *